(12) United States Patent
Van Swearingen et al.

(10) Patent No.: US 9,889,586 B2
(45) Date of Patent: *Feb. 13, 2018

(54) LOW PRESSURE MOLDED STRAIN RELIEF FOR COAXIAL CONNECTOR INTERCONNECTION

(71) Applicant: CommScope Technologies LLC, Hickory, NC (US)

(72) Inventors: Kendrick Van Swearingen, Woodridge, IL (US); James J Carlock, Homer Glen, IL (US); James P Fleming, Orland Park, IL (US)

(73) Assignee: CommScope Technologies LLC, Hickory, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/809,344

(22) Filed: Jul. 27, 2015

(65) Prior Publication Data

US 2015/0340804 A1 Nov. 26, 2015

Related U.S. Application Data

(62) Division of application No. 13/251,341, filed on Oct. 3, 2011, now Pat. No. 9,108,348.

(51) Int. Cl.
*H01R 13/58* (2006.01)
*B29C 45/14* (2006.01)
*H01R 9/05* (2006.01)
*B29L 31/00* (2006.01)

(52) U.S. Cl.
CPC .. *B29C 45/14311* (2013.01); *B29C 45/14491* (2013.01); *B29C 45/14549* (2013.01); *H01R 9/05* (2013.01); *H01R 13/5845* (2013.01); *B29C 45/14639* (2013.01); *B29L 2031/707* (2013.01)

(58) Field of Classification Search
None
See application file for complete search history.

(56) References Cited

U.S. PATENT DOCUMENTS

| 3,135,571 A | 6/1964 | Klinkwitz |
| 3,366,917 A | 1/1968 | Karol |
| 4,203,004 A | 5/1980 | Cox |

(Continued)

FOREIGN PATENT DOCUMENTS

| EP | 0083464 | 7/1985 |
| GB | 2242577 | 10/1991 |

(Continued)

OTHER PUBLICATIONS

Park Jung Min, International Search Report from related PCT filing PCT /US2011/052907, Seo-Gu, Daejeon, Republic of South Korea, dated Mar. 22, 2012.

(Continued)

*Primary Examiner* — Edmund Lee
(74) *Attorney, Agent, or Firm* — Myers Bigel, P.A.

(57) ABSTRACT

A strain relief for a coaxial cable and coaxial connector interconnection is provided as an injection moldable polymer material surrounding the interconnection. The injection moldable material fills a solder pre-form cavity between an outer conductor of the coaxial cable and an inner diameter of a bore of the connector body, strengthening and environmentally sealing the interconnection.

10 Claims, 4 Drawing Sheets

(56) References Cited

U.S. PATENT DOCUMENTS

| | | |
|---|---|---|
| 4,461,529 A | 7/1984 | Fariss |
| 4,684,201 A | 8/1987 | Hutter |
| 4,715,821 A | 12/1987 | Axell |
| 4,718,860 A | 6/1988 | Gobets et al. |
| 4,786,760 A | 11/1988 | Friedhelm |
| 5,030,135 A | 7/1991 | Plesinger |
| 5,390,272 A | 2/1995 | Repta et al. |
| 5,393,244 A * | 2/1995 | Szegda ............... H01R 24/40 439/394 |
| 5,453,029 A | 9/1995 | Moldenhauer et al. |
| 5,750,933 A | 5/1998 | Brady |
| 5,772,470 A | 6/1998 | Togashi |
| 5,792,988 A | 8/1998 | McIntire et al. |
| 5,802,710 A | 9/1998 | Bufanda et al. |
| 6,139,354 A | 10/2000 | Broussard |
| 6,479,754 B1 | 11/2002 | Muzslay |
| 6,733,322 B2 | 5/2004 | Boemmel et al. |
| 6,840,803 B2 | 1/2005 | Wlos et al. |
| 7,121,899 B2 | 10/2006 | Homann et al. |
| 7,198,507 B2 | 4/2007 | Tusini |
| 7,628,545 B2 | 12/2009 | Cody et al. |
| 7,635,283 B1 * | 12/2009 | Islam ..................... H01R 9/05 439/583 |
| 7,677,812 B2 | 3/2010 | Castagna et al. |
| 7,695,197 B2 | 4/2010 | Gurreri |
| 9,755,328 B2 * | 9/2017 | Van Swearingen .. H01R 9/0503 |
| 2003/0173707 A1 | 9/2003 | Becker et al. |
| 2004/0029433 A1 | 2/2004 | Lee et al. |
| 2004/0094605 A1 | 5/2004 | Wild et al. |
| 2009/0232594 A1 | 9/2009 | Ng et al. |

FOREIGN PATENT DOCUMENTS

| | | |
|---|---|---|
| GB | 2263827 | 8/1993 |
| JP | 2000221371 | 8/2000 |

OTHER PUBLICATIONS

Sung Gon Kim, International Search Report of Counterpart International Application No. PCT/US2012/053573, dated Feb. 18, 2013, Daejeon Metropolitan City, Korea.

Christoph Vetter, European Search Report for EPO Application 12838793.3, dated Feb. 12, 2015, European Patent Office, Munich, Germany.

* cited by examiner

LOW PRESSURE MOLDED STRAIN RELIEF FOR COAXIAL CONNECTOR INTERCONNECTION

CROSS-REFERENCE TO PATENT APPLICATION

This patent application is a continuation of U.S. patent application Ser. No. 13/251,341, now U.S. Pat. No. 9,108,348, and entitled "Method for molding a low pressure molded strain relief for coaxial connector interconnection", which was filed on Oct. 3, 2011, and is incorporated herein by reference in its entirety.

BACKGROUND OF THE INVENTION

Field of the Invention

This invention relates to a strain relief for a Coaxial RF Connector. More specifically, the invention relates to a strain relief moldable about the cable to connector interconnection, providing sealing and strength characteristics which enhance the coaxial connector to coaxial cable interconnection.

Description of Related Art

Coaxial cables and coaxial connectors are used, for example, in communication systems requiring a high level of precision and reliability. To create a cost efficient electromechanical interconnection between the coaxial cable and the coaxial connector, it is often desirable to interconnect the cable and connector via soldering.

Solder pre-forms may be utilized to improve interconnection quality when soldering coaxial connectors to coaxial cables. The use of a solder pre-form standardizes the location and amount of solder applied. Representative of this technology is commonly owned U.S. Pat. No. 5,802,710 issued Sep. 8, 1998 to Bufanda et al (Bufanda). Bufanda discloses a solder pre-form with a planar connector side (outer surface) and a cable side (inner surface) dimensioned to key with corrugations of an annular corrugated outer conductor.

Other solder pre-forms, for example for soldering a coaxial connector with a smooth sidewall outer conductor coaxial cable, have been provided as a plurality of annular rings and/or a cylindrical tube. For ease of assembly prior to soldering, the solder pre-forms typically fit loosely within a desired interconnection area solder cavity formed between the connector body and the outer conductor.

Connector to cable interconnection soldering is typically performed with the connector and coaxial cable vertically oriented, for example as disclosed in U.S. Pat. No. 7,900,344 issued Mar. 8, 2011 to Ng, et al. Thereby, when heat is applied to the solder pre-form during the solder process, the solder liquefies and pools in the bottom of the interconnection area solder cavity. The solder pooling leaves an annular solder pre-form cavity between the outer conductor and the connector body that extends to the cable end of the connector body.

Coaxial cables may utilize aluminum material, for example to realize a cost of materials and/or weight savings advantage. However, use of aluminum may also introduce the disadvantages of reduced strength and/or bending resilience. Aluminum material exposed to air quickly oxidizes, forming an aluminum oxide coating that interferes with solder bonding. Special aluminum material specific soldering flux with a heat activated high acid content may be used to prepare aluminum material surfaces for soldering. However, such flux may be difficult to apply evenly within the interconnection area.

Heat shrink tubing has been utilized as a cosmetic and/or strain relief improvement for connector to coaxial cable terminations. However, heat shrink tubing may provide only a limited environmental seal that may allow moisture ingress/condensation which then pools under the heat shrink tubing, directly upon the interconnection.

Therefore, it is an object of the invention to provide an apparatus and method of manufacture that overcomes deficiencies in such prior art.

BRIEF DESCRIPTION OF THE DRAWINGS

The accompanying drawings, which are incorporated in and constitute a part of this specification, illustrate embodiments of the invention and, together with a general description of the invention given above, and the detailed description of the embodiments given below, serve to explain the principles of the invention.

DETAILED DESCRIPTION

The inventor has recognized that solder interconnections between coaxial connectors and coaxial cables, particularly where coaxial cables with aluminum material outer conductors are utilized, may have significant strength deficiencies due to the relative strength and resilience of aluminum outer conductors compared to the prior copper material outer conductors. Further, because the specialized flux used in preparation for soldering aluminum material is difficult to smoothly apply, an excess of flux may be applied resulting in flux residue at the completion of the solder operation that then requires additional steps to remove, where possible.

The residue of flux may be merged within the solder joint in the form of channels and/or cavities, making removal of all flux residue, particularly from the immediate area of the solder joint, impractical and/or impossible. The inventor has further recognized that this flux may also be hygroscopic and increasingly corrosive as water is absorbed.

The inventor has created a strain relief for coaxial connectors which improves both the overall strength of the joint and the seal sealing properties of the strain relief upon the interconnection.

Figure 1:
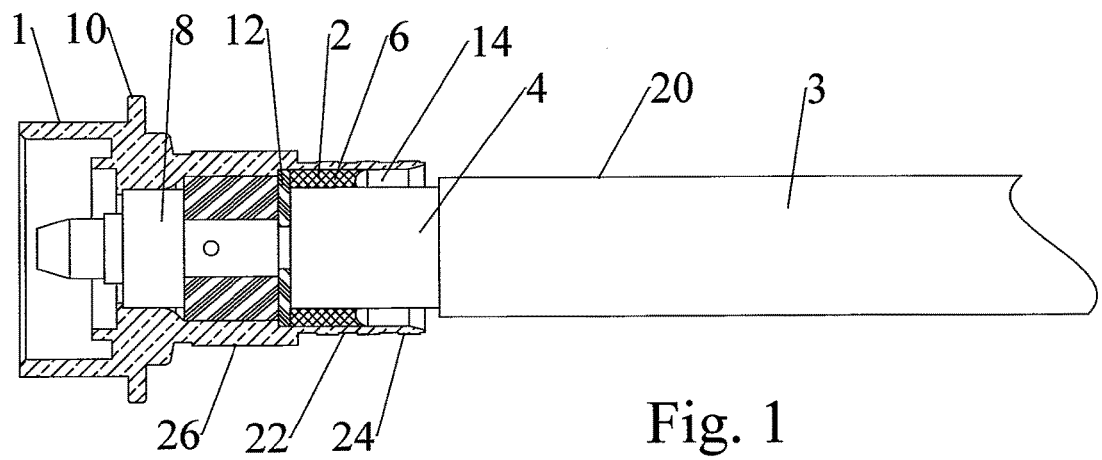
FIG. 1 is a schematic partial cut-away view of a coaxial connector to coaxial cable solder interconnection.

As shown in FIG. 1, an interconnection between a coaxial connector 1 and a coaxial cable 3 utilizes a solder joint 2 between the outer diameter of the outer conductor 4 and an inner diameter of an interconnection area 6 of the bore 8 of a connector body 10. A dielectric disc 12 may be applied to close the connector end of the interconnection area 6, thereby reducing the chance of molten solder egress from the connection area 6. As the solder pre-form melts and pools, an annular pre-form cavity 14 is formed between the resulting solder joint 2, inner diameter of the bore 8, outer diameter of the outer conductor 4 and a cable end of the connector body 10.

Figure 2:
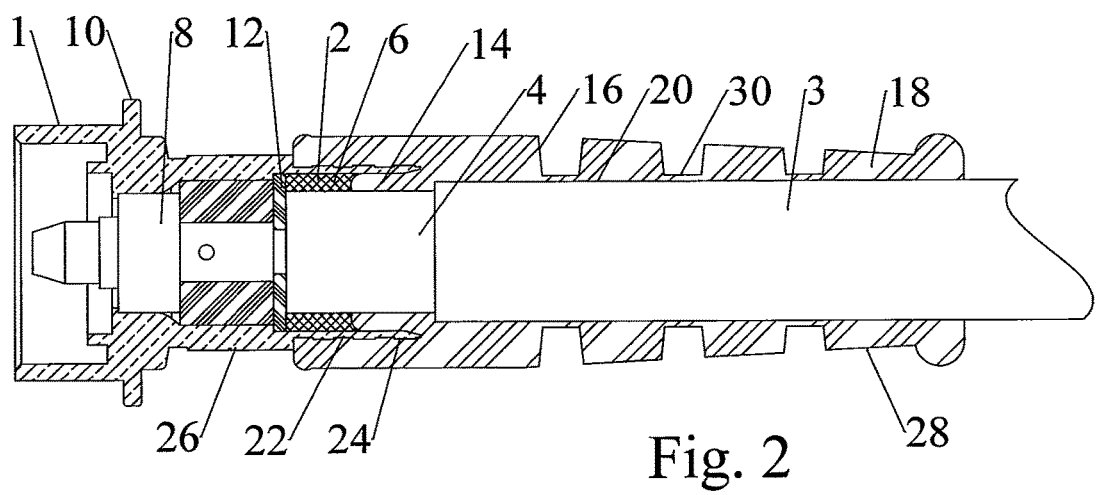
FIG. 2 is a schematic partial cut-away side view of the coaxial connector to coaxial cable solder interconnection of FIG. 1 with an exemplary strain relief applied.

A strain relief 16 for the coaxial cable and coaxial connector interconnection may be formed by injection molding a polymer material to surround the interconnection with at least one contiguous polymer portion 18, for example as shown in FIG. 2.

The polymer material may be a thermoplastic material suitable for low temperature, low pressure injection molding, with resilient characteristics that is ultra-violet resistant and weatherproof. A suitable polymer material is polyamide; an exemplary polyamide material is Macromelt® OM 648, available from Henkel AG & Co. KGaA of Dusseldorf, Germany.

Low pressure injection molding provides suitable cavity penetration, without otherwise damaging the existing coaxial cable and/or interconnection. A preferred pressure range for the low pressure injection molding is between 5 and 40 bar. Similarly, the heat of the injection molding should be low enough to avoid softening the solder joint, damaging the polymer insulation and/or outer jacket 20 of the coaxial cable 3. A preferred temperature range of the injection molding is between 200 and 240 degrees Celsius.

Figure 3:
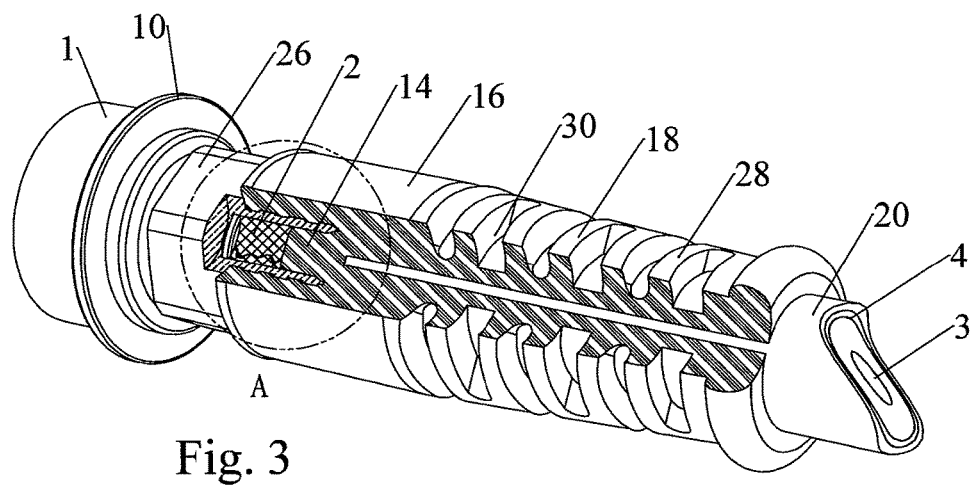
FIG. 3 is a schematic isometric view of FIG. 2, with a partial cut-away portion to clarify details of the strain relief.
Figure 4:
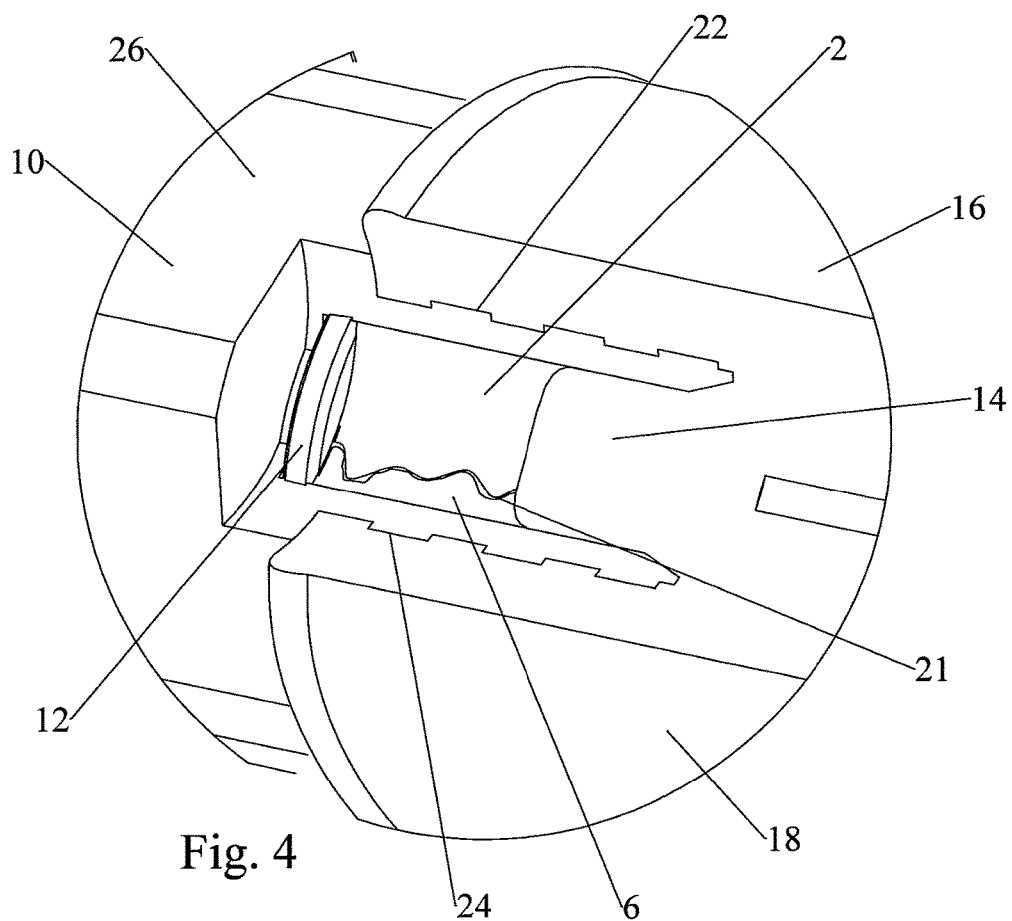
FIG. 4 is a close-up of area A of FIG. 3.
Figure 5:
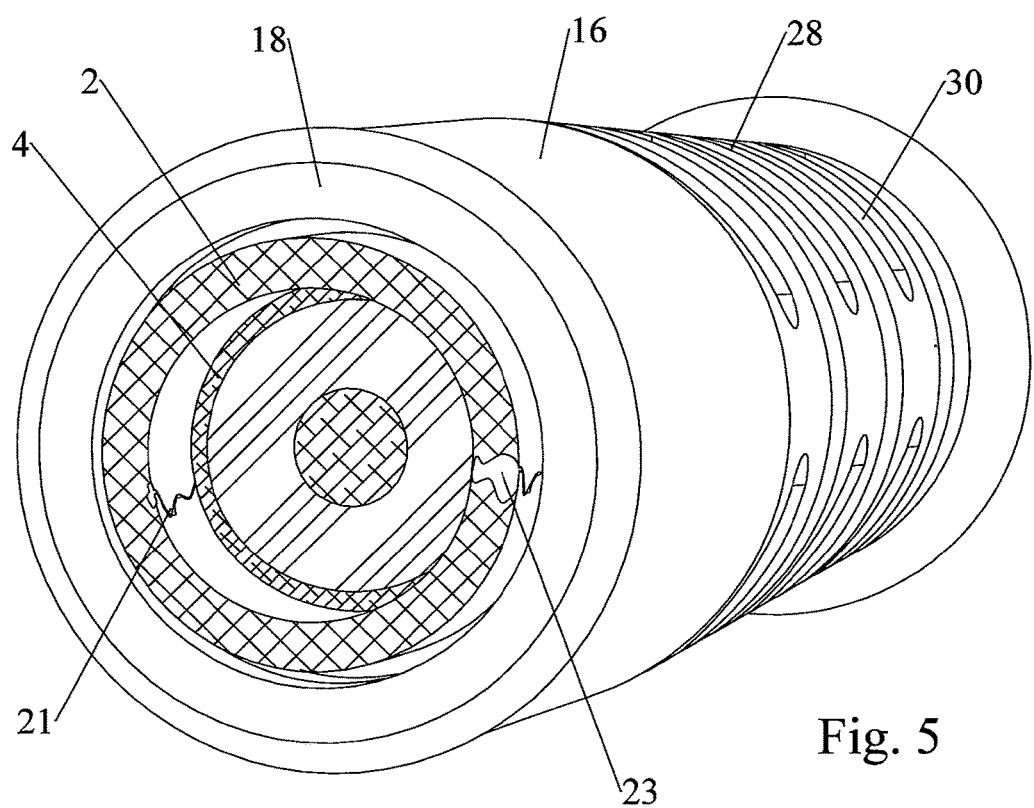
FIG. 5 is a schematic isometric cut-away end view of the coaxial connector to coaxial cable solder interconnection of FIG. 2, demonstrating a partial cross section of the interconnection area, with the connector body removed for clarity of understanding potential cavity and/or channel defects of the solder joint.

The liquid injection of the polymer material during the low pressure injection molding fills the pre-form cavity 14, and seals against the connector body 10 and outer jacket 20, encapsulating any remaining flux and/or further filing any voids, channels 21 and/or cavities 23 that may be present in the solder joint, for example as shown in FIGS. 3-5. Thereby, the solder joint 2 and any flux residue is entirely encapsulated from moisture ingress that may corrode the metal surfaces and/or react with the flux residue to initiate accelerated corrosion of the metal surfaces and/or solder joint.

As best shown in FIG. 2, the strain relief 16 may be shaped to a desired coverage area, thickness and/or external surface configuration by the mold that is applied around the interconnection during the injection molding.

Figure 6:
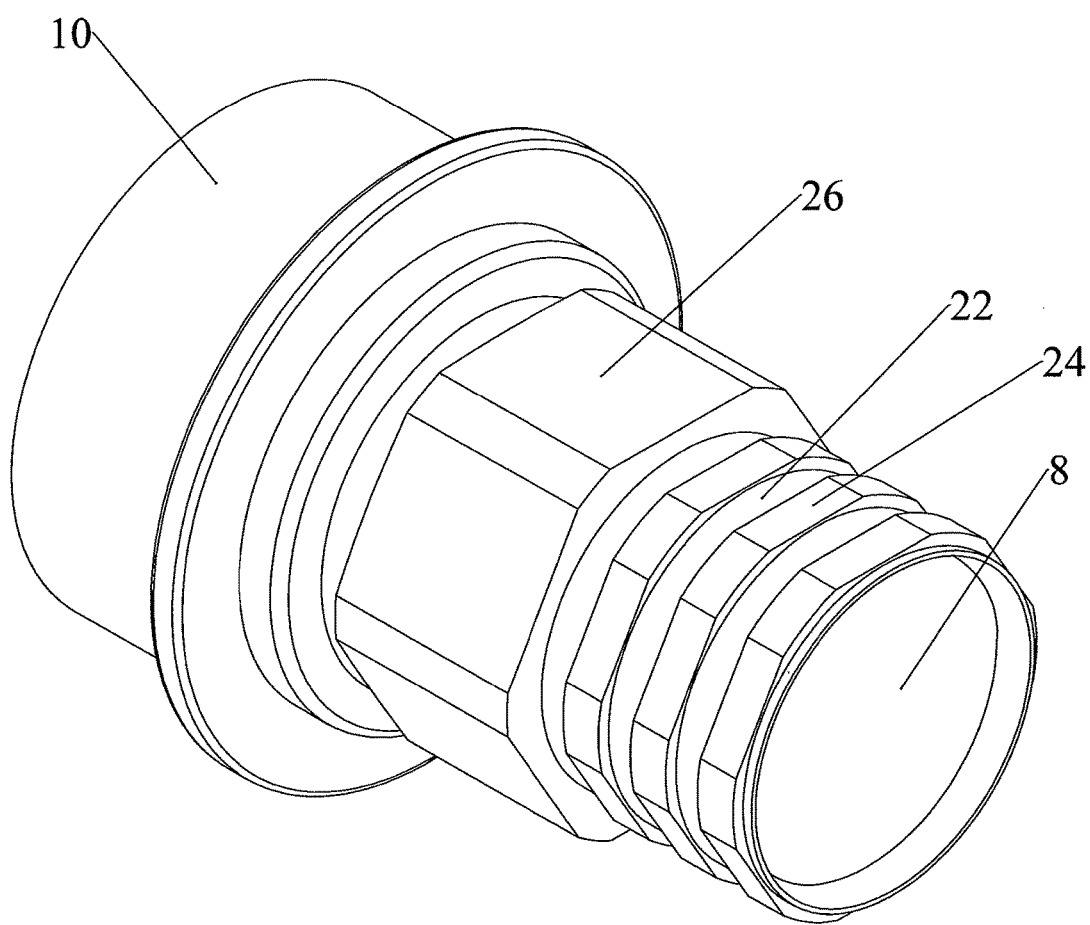
FIG. 6 is a schematic isometric view of the connector body of the coaxial connector of FIG. 1.

The strain relief 16 may be anchored upon a strain relief portion 22 of the connector body 10 of the coaxial connector 1. The strain relief portion 22 may be provided with a plurality of retention features, such as grooves, protrusions or the like. As best shown in FIG. 6, where the retention features are non-cylindrical, such as raised segments 24, an anti-rotation characteristic is provided which further increases the seal and/or retention of the strain relief 16 upon the strain relief portion 22. The strain relief portion 22 may be provided adjacent to a tool face portion 26 of the connector body provided with tool faces for receiving a hand tool or the like to hold the connector stationary as a coupling nut is threaded during interconnection of the connector with another connector and/or device. One skilled in the art will appreciate that where the raised segments 24 and tool face portion 26 are applied with a common geometry, anti-rotation benefits of the raised segments 24 are realized and machining of the connector body 10 may be simplified.

The strain relief 16 may have a cable portion 28 extending over the coaxial cable 3 which tapers toward the cable end, providing reinforcement to the interconnection which also tapers, such that the reinforcement provided by the strain relief 16 does not abruptly terminate at a rigid edge where the coaxial cable 3 would likely buckle if subjected to excess bending forces near the interconnection.

A cable portion 28 of the strain relief 16 may extend away from the interconnection over the coaxial cable 3 a significant length, such as a distance greater than three diameters of the coaxial cable 3.

In addition to and/or instead of a taper applied to the cable portion 28, the cable portion 28 may be provided with a plurality of stress relief grooves 30. The stress relief grooves 30 may be applied as generally elliptical grooves with a major axis of the stress relief grooves 30 arranged normal to a longitudinal axis of the coaxial connector 3. A spacing, width and/or depth of the stress relief grooves 30 may be adjusted to progressively reduce a bending resistance toward the cable end, further enhancing a tapered support characteristic, which while significantly increasing the strength of the interconnection, also protects the coaxial cable 3 from buckling proximate the end of the strain relief 16 due to any excess bending forces that may be applied, thereby increasing both the overall strength and the flexibility characteristics of the interconnection.

One skilled in the art will appreciate that a strain relief 16 according to the invention may improve connector body to outer conductor interconnection strength and environmental seal. Thereby, prior concerns of flux residue contributing to accelerated degradation of the interconnection quality and/or environmental sealing of a solder joint 2 that may contain cavities and/or channels are reduced, especially where aluminum materials are being utilized. Thereby, the further adoption of aluminum material use in the coaxial connector and/or coaxial cable arts is enabled, which in turn may enable significant material cost savings for connector and coaxial cable manufacturers.

| Table of Parts | |
|---|---|
| 1 | coaxial connector |
| 2 | solder joint |
| 3 | coaxial cable |
| 4 | outer conductor |
| 6 | interconnection area |
| 8 | bore |
| 10 | connector body |
| 12 | dielectric disc |
| 14 | pre-form cavity |
| 16 | strain relief |
| 18 | polymer portion |
| 20 | outer jacket |
| 21 | channel |
| 22 | strain relief portion |
| 23 | cavities |
| 24 | raised segment |
| 26 | tool face portion |
| 28 | cable portion |
| 30 | stress relief groove |

Where in the foregoing description reference has been made to ratios, integers or components having known equivalents then such equivalents are herein incorporated as if individually set forth.

While the present invention has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details, representative apparatus, methods, and illustrative examples shown and described. Accordingly, departures may be made from such details without departure from the spirit or scope of applicant's general inventive concept. Further, it is to be appreciated that improvements and/or modifications may be made thereto without departing from the scope or spirit of the present invention as defined by the following claims.

We claim:

1. A strain relief for coaxial cable and coaxial connector interconnection, wherein the interconnection comprises a coaxial cable having an outer conductor and a coaxial connector having an outer connector body having an inner diameter; the outer conductor being soldered to the outer connector body at a solder joint, the strain relief comprising;
    an injection moldable polymer material surrounding the interconnection;
    the injection moldable material filling a solder pre-form cavity between the outer conductor of the coaxial cable and the inner diameter of the outer connector body adjacent the solder joint.

2. The strain relief of claim 1, wherein the injection moldable polymer material is polyamide material.

3. The strain relief of claim 1, wherein the polymer material is provided with a cable portion provided with a plurality of stress relief grooves.

4. The strain relief of claim 3, wherein the stress relief control grooves are generally elliptical, with a major axis of the stress relief grooves arranged normal to a longitudinal axis of the coaxial connector.

5. The strain relief of claim 3, wherein the extended cable portion extends along the coaxial cable a distance greater than three diameters of the coaxial cable.

6. The strain relief of claim 1, wherein the strain relief surrounding the coaxial connector is seated upon a strain relief portion of the outer connector body of the coaxial connector.

7. The strain relief of claim 6, wherein the strain relief portion is provided with a plurality of retention features.

8. The strain relief of claim 7, wherein the retention features are non-cylindrical raised segments.

9. The strain relief of claim 6, wherein the strain relief portion abuts a tool face portion of the outer connector body of the coaxial connector.

10. The strain relief of claim 7, wherein the retention features are annular grooves.

* * * * *